(12) United States Patent
Dunne et al.

(10) Patent No.: US 11,176,319 B2
(45) Date of Patent: Nov. 16, 2021

(54) LEVERAGING A TOPIC DIVERGENCE MODEL TO GENERATE DYNAMIC SIDEBAR CHAT CONVERSATIONS BASED ON AN EMOTIVE ANALYSIS

(71) Applicant: INTERNATIONAL BUSINESS MACHINES CORPORATION, Armonk, NY (US)

(72) Inventors: Jonathan Dunne, Dungarvan (IE); Muneeb Arshad, Poughkeepsie, NY (US); Megan Capobianco, Highland, NY (US); Gregory Ecock, White Plains, NY (US); Vijai Kalathur, Wappingers Falls, NY (US); Christopher Potter, Poughkeepsie, NY (US); Daniela Regier, New Paltz, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

(21) Appl. No.: 16/103,051

(22) Filed: Aug. 14, 2018

(65) Prior Publication Data
US 2020/0057808 A1 Feb. 20, 2020

(51) Int. Cl.
*H04L 12/58* (2006.01)
*G06K 9/62* (2006.01)
(Continued)

(52) U.S. Cl.
CPC .......... *G06F 40/216* (2020.01); *G06F 40/284* (2020.01); *H04L 12/1831* (2013.01); *H04L 51/046* (2013.01)

(58) Field of Classification Search
CPC ..... H04L 51/04; G06K 9/6269; G06F 40/284; G06Q 10/063114; G06Q 10/10
(Continued)

(56) References Cited

U.S. PATENT DOCUMENTS 6,104,989 A  8/2000  Kanevsky et al.
6,393,460 B1  5/2002  Gruen et al.
(Continued)

OTHER PUBLICATIONS

Jonsson et al., "An Evaluation of Topic Modelling Techniques for Twitter", https://www.cs.toronto.edu/~jstolee/projects/topic.pdf, accessed Aug. 3, 2018, 11 pages.
(Continued)

*Primary Examiner* — Farzad Kazeminezhad
(74) *Attorney, Agent, or Firm* — Maeve Carpenter; Andrew D. Wright; Roberts Calderon Safran & Cole, P.C.

(57) ABSTRACT

Methods and systems for leveraging a topic divergence model to generate dynamic sidebar chat conversations are disclosed. A method includes: collecting, by a computing device, data from a first group chat; determining, by the computing device, a main topic of the first group chat and a current topic of the first group chat using the data collected from the first group chat; determining, by the computing device, a first divergence score representing a degree of divergence between the main topic of the first group chat and the current topic of the first group chat; determining, by the computing device, that the first divergence score exceeds a predetermined threshold; and in response to determining that the first divergence score exceeds the predetermined threshold, the computing device creating a second group chat; determining an efficacy based on an emotive analysis which increases as the divergence score decreases.

19 Claims, 5 Drawing Sheets

(51) Int. Cl.
*G06F 40/284* (2020.01)
*G06Q 10/06* (2012.01)
*G06F 40/216* (2020.01)
*H04L 12/18* (2006.01)

(58) Field of Classification Search
USPC .............................. 725/110; 709/204; 706/54
See application file for complete search history.

(56) References Cited

U.S. PATENT DOCUMENTS

| | | | |
|---|---|---|---|
| 2003/0131055 | A1 | 7/2003 | Yashchin et al. |
| 2008/0077572 | A1* | 3/2008 | Boyle .................... G06F 40/284 |
| 2009/0228944 | A1* | 9/2009 | Bodlaender ......... H04L 12/1827 |
| | | | 725/110 |
| 2009/0319917 | A1 | 12/2009 | Fuchs et al. |
| 2010/0005402 | A1 | 1/2010 | George et al. |
| 2010/0268681 | A1* | 10/2010 | Guo ....................... G06Q 10/10 |
| | | | 706/54 |
| 2015/0200879 | A1 | 7/2015 | Wu et al. |
| 2016/0191578 | A1* | 6/2016 | Kim ........................ H04L 51/04 |
| | | | 709/204 |
| 2016/0364368 | A1 | 12/2016 | Chen et al. |
| 2017/0032021 | A1 | 2/2017 | Watanachote |
| 2018/0322188 | A1* | 11/2018 | Zhou ..................... G06K 9/6269 |
| 2018/0324116 | A1* | 11/2018 | Vaduva .................. H04L 51/04 |
| 2019/0057143 | A1* | 2/2019 | Porter ............ G06Q 10/063114 |

OTHER PUBLICATIONS

Biei et al., "Latent Dirichlet Allocation", http://www.jmlr.org/papers/volume3/blei03a/blei03a.pdf, Journal of Machine Learning Research 3, pp. 993-1022, 2003, 30 pages.

Anonymous, "word2vec graph", https://github.com/anvaka/word2vec-graph, GitHub, accessed Aug. 3, 2018, 6 pages.

Steyvers et., "Probabilistic Topic Models", http://psiexp.ss.uci.edu/research/papersSteyversGriffithsLSABookFormatted.pdf, In: In T. Landauer, D McNamara, S. Dennis, and W. Kintsch (eds), Latent Semantic Analysis: A Road to Meaning. Laurence Erlbaum, accessed Aug. 3, 2018, 15 pages.

Yan et al., "A Biterm Topic Model for Short Texts", http://citeseerx.ist.psu.edu/viewdoc/download?doi=10.1.1.402.4032&rep=rep1&type=pdf, accessed Aug. 10, 2018, 11 pages.

Bengel et al., "ChatTrack: Chat Room Topic Detection Using Classification", https://www.researchgate.net/publication/2878766, Mar. 4, 2014, 11 pages.

* cited by examiner

LEVERAGING A TOPIC DIVERGENCE MODEL TO GENERATE DYNAMIC SIDEBAR CHAT CONVERSATIONS BASED ON AN EMOTIVE ANALYSIS

BACKGROUND

The present invention generally relates to computing devices and, more particularly, to methods and systems for leveraging a topic divergence model to generate dynamic sidebar chat conversations.

A group chat session typically includes a plurality of participating users who are discussing a particular topic. The group chat session typically takes place within a graphical user interface that displays real-time responses from each of the plurality of participating users. The responses commonly include text, graphics, videos, sounds, and/or attachments such as files. Each of the responses are normally arranged in order of a time when a user sent the response. Additionally, the graphical user interface typically displays a list of the plurality of participating users.

SUMMARY

In a first aspect of the invention, there is a method that includes: collecting, by a computing device, data from a first group chat; determining, by the computing device, a main topic of the first group chat and a current topic of the first group chat using the data collected from the first group chat; determining, by the computing device, a first divergence score representing a degree of divergence between the main topic of the first group chat and the current topic of the first group chat; determining, by the computing device, that the first divergence score exceeds a predetermined threshold; and in response to determining that the first divergence score exceeds the predetermined threshold, the computing device creating a second group chat.

In another aspect of the invention, there is a computer program product that includes a computer readable storage medium having program instructions embodied therewith. The program instructions are executable by a computing device to cause the computing device to: collect data from a first group chat; determine a main topic of the first group chat and a current topic of the first group chat using the data collected from the first group chat; determine a first divergence score representing a degree of divergence between the main topic of the first group chat and the current topic of the first group chat; determine that the first divergence score exceeds a predetermined threshold; in response to determining that the first divergence score exceeds the predetermined threshold, creating a second group chat; determine an efficacy score for the second group chat; and adjust the predetermined threshold based on the efficacy score for the second group chat.

In another aspect of the invention, there is a system that includes: a hardware processor, a computer readable memory, and a computer readable storage medium associated with a computing device; program instructions configured to collect data from a first group chat; program instructions configured to determine a main topic of the first group chat and a current topic of the first group chat using the data collected from the first group chat; program instructions configured to determine a first divergence score representing a degree of divergence between the main topic of the first group chat and the current topic of the first group chat; program instructions configured to determine that the first divergence score exceeds a first predetermined threshold; and program instructions configured to create a second group chat in response to determining that the first divergence score exceeds the first predetermined threshold, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to computing devices and, more particularly, to methods and systems for leveraging a topic divergence model to generate dynamic sidebar chat conversations. As described herein, aspects of the invention include a method and system for recognizing a shift to a new topic of conversation in a group chat and, in response to the shift to the new topic, creating a sidebar chat space within the group chat setting. In embodiments, a method and system are provided that analyze chat data, create a topic divergence model, use the newly created topic divergence model to determine when a chat topic diverges, and create a sidebar chat space for the group chat attendees. Additionally, in embodiments, a method and system are provided that subsequently analyze sidebar chat data to estimate the efficacy of the topic divergence model and make adjustments to the topic divergence model.

Conversations often wander off-topic in group chats that discuss specific topics. These off-topic discussions may make the main (on-topic) conversation unproductive, confusing, and disruptive. However, these off-topic conversations can be valuable and constructive if held in the right space. Conventional group chat methods and systems do not provide a mechanism for identifying off-topic discussions and dynamically triggering productive sidebar discussions.

Embodiments of the invention address the above-mentioned shortcomings associated with conventional group chat methods and systems. As described herein, aspects of the invention include a method and system that conduct emotive analysis on a group chat space to infer whether a sidebar chat space is required or was useful. In particular, keywords and phrases are monitored to determine whether or not a sidebar chat space is required. Additionally, active participation ratios are tracked and participation rates of subject matter experts are evaluated to infer whether or not a sidebar chat space is required. Additionally, group chats are analyzed for conceptual complexity of topics, and when complexity crosses a high threshold, that topic is "quarantined" in a sidebar chat space.

As described herein, aspects of the invention monitor sidebar chat conversations to determine whether or not to dynamically pull in experts based on topic of discussion. Profiles of participants are generated based on topics about which the participant usually converses and users with whom the participant most frequently interacts to establish patterns. External data such as email, social media, and other chat history is leveraged to generate data points regarding inferred relationships and topics of interest. Additionally, in embodiments, if a sidebar chat conversation is deemed useful, a summary of the sidebar chat conversation is provided to the main main group, if the topic is determined to be relevant.

Embodiments improve the functioning of a computer by leveraging a topic divergence model to generate dynamic sidebar chat conversations. In particular, embodiments improve software by dynamically detecting topic changes in group chats using the topic divergence model, creating sidebar chat spaces in real-time, and refining the topic divergence model to ensure consistent results. Additionally, embodiments provide an improved graphical user interface for group chats in which off-topic conversations are moved to a sidebar chat space. Additionally, the invention uses techniques that are, by definition, rooted in computer technology (e.g., machine learning, natural language processing, a topic divergence model, a group chat graphical user interface, etc.) that cannot be performed manually by a person.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
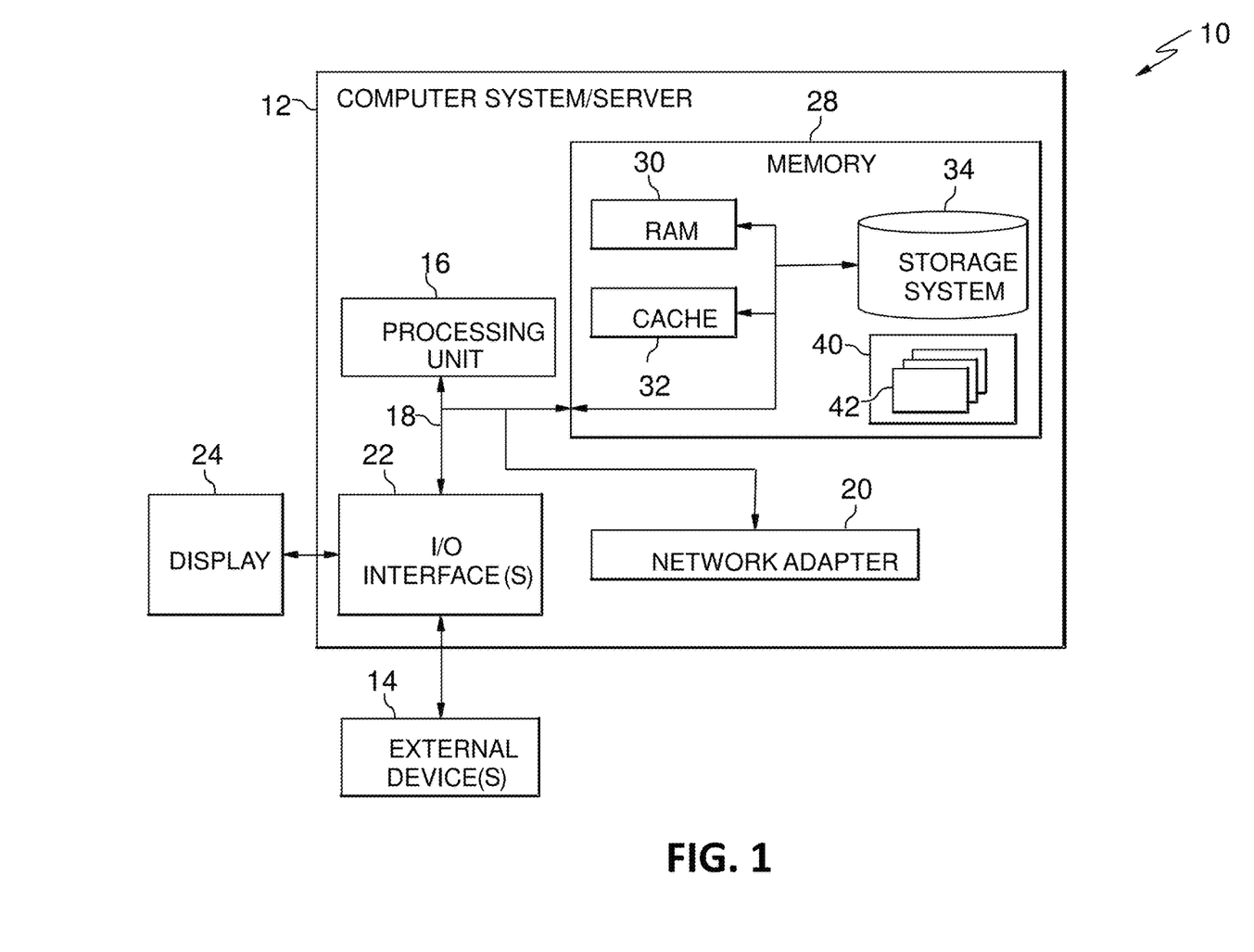
FIG. 1 depicts a computer system in accordance with aspects of the invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
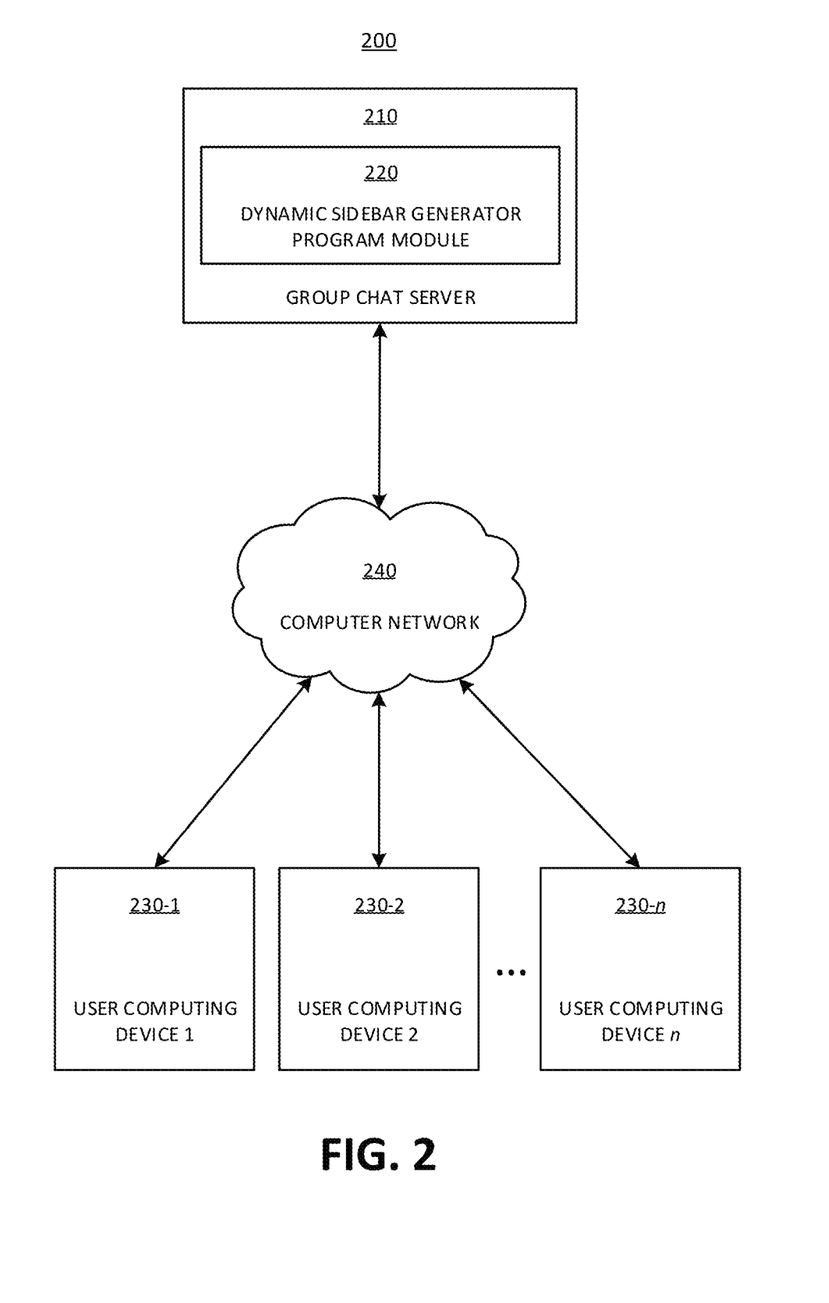
FIG. 2 depicts an illustrative environment in accordance with aspects of the invention.

FIG. 2 depicts an illustrative environment 200 in accordance with aspects of the invention. As shown, the environment 200 comprises a group chat server 210 and a plurality of user computing devices 230-1, 230-2, . . . , 230-n which are in communication via a computer network 240. In embodiments, the computer network 240 is any suitable network including any combination of a LAN, WAN, or the Internet. In embodiments, the group chat server 210 and the user computing devices 230-1, 230-2, . . . , 230-n are physically collocated, or, more typically, are situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the group chat server 210 is a computer system/server 12 (as shown in FIG. 1). In particular, the group chat server 210 may be implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the group chat server 210 includes a dynamic sidebar generator program module 220, which includes hardware and/or software and is one or more of the program modules 42 shown in FIG. 1. According to an embodiment, the dynamic sidebar generator program module 220 includes program instructions for leveraging a topic divergence model to generate dynamic sidebar chat conversations. In embodiments, the program instructions included in the dynamic sidebar generator program module 220 of the group chat server 210 are executed by one or more hardware processors.

Still referring to FIG. 2, in embodiments, each of the user computing devices 230-1, 230-2, . . . , 230-n is a computer system/server 12 (as shown in FIG. 1) and may be a desktop computer, a laptop computer, a mobile device such as a cellular phone, tablet, personal digital assistant (PDA), or any other computing device. In other embodiments, each of the user computing devices 230-1, 230-2, . . . , 230-n may be implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, each of the user computing devices 230-1, 230-2, . . . , 230-n is usable by a user to interact with a group chat hosted by the group chat server 210. In particular, the group chat server 210 causes each of the user computing devices 230-1, 230-2, . . . , 230-n to display a group chat graphical user interface, including group chat messages from a plurality of group chat participants. A user of one of the user computing devices 230-1, 230-2, . . . , 230-n sends a group chat message including text, graphics, videos, sounds, and/or attachments such as files to the group chat server 210 via the computer network 240. The group chat server 240 then causes each of the user computing devices 230-1, 230-2, . . . , 230-n to display the group chat message from the user in real-time.

Figure 3:
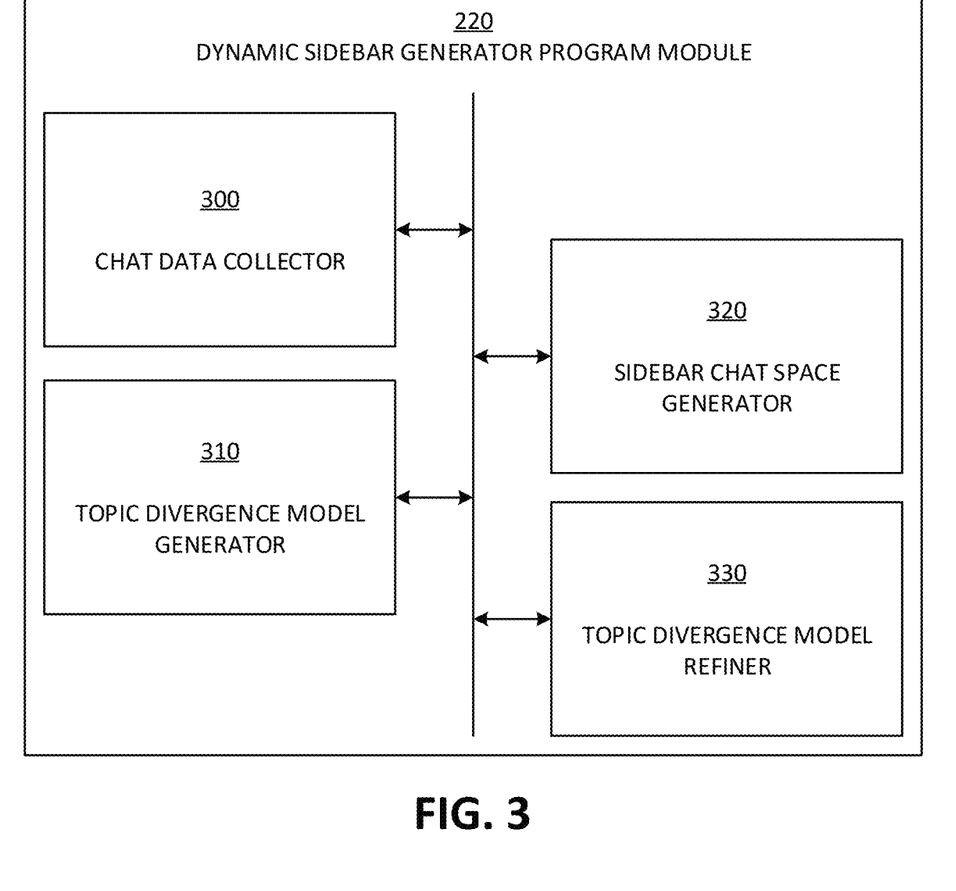
FIG. 3 depicts a block diagram of an exemplary program module in accordance with aspects of the invention.

FIG. 3 depicts a block diagram of an exemplary dynamic sidebar generator program module 220 in the group chat server 210 (of FIG. 2) in accordance with aspects of the invention. In embodiments, the dynamic sidebar generator program module 220 includes a chat data collector 300, a topic divergence model generator 310, a sidebar chat space generator 320, and a topic divergence model refiner 330, each of which comprises one or more program modules 42 as described with respect to FIG. 1. In other embodiments, the dynamic sidebar generator program module 220 includes additional or fewer components than those shown in FIG. 3. In other embodiments, separate components are integrated into a single computing component or module. Additionally, or alternatively, in embodiments, a single component is implemented as multiple computing components or modules. According to another embodiment, the functions of one or more of the chat data collector 300, the topic divergence model generator 310, the sidebar chat space generator 320, and the topic divergence model refiner 330 are provided as services in a distributed computing environment.

In embodiments, the chat data collector 300 collects data from a current (i.e., ongoing) group chat session in the group chat server 210. In embodiments, the chat data collector 300 also collects data from prior group chat sessions in the group chat server 210. In particular, the chat data collector 300 collects chat logs with time stamps, channel names, participant names, and information about file uploads.

In an example, each of the chat logs collected by the chat data collector 300 includes a plurality of messages posted to a group chat along with a time stamp and participant name associated with each message. In aspects, each of the channel names collected by the chat data collector 300 is a name that describes a topic of conversation for a group chat and/or a particular group of participants (e.g., salespersons) participating in the group chat. In additional aspects, each of the participant names collected by the chat data collector 300 includes a name and/or a position (e.g., vice president of sales) of a person participating in the group chat. In embodiments, the information about file uploads collected by the chat data collector 300 includes, for each file upload, a file name, a file description, and/or a name of the group chat participant who uploaded the file.

The chat data collector 300 stores the data collected from the current group chat session and prior group chat sessions (e.g., chat logs with time stamps, channel names, participant names, and information about file uploads) in a non-Structured Query Language (NoSQL)/non-relational database or using JavaScript Object Notation (JSON), either in the group chat server 210 or in another storage location accessible to the group chat server 210. In an alternative embodiment, the chat data collector 300 stores the collected data in a Structured Query Language (SQL)/relational database or using any other storage format.

Still referring to FIG. 3, in embodiments, the topic divergence model generator 310 generates a topic divergence model using the chat data collected by the chat data collector 300. In particular, the topic divergence model generator 310 analyzes the chat data collected by the chat data collector 300 using a topic modeling algorithm. Specifically, the topic divergence model generator 310 uses the topic modeling algorithm to determine a main topic of discussion in the current group chat session based on prior chat data collected by the chat data collector 300. Additionally, recent messages (e.g., messages from the last 10 minutes, the last 10 messages posted to the group chat, or any other group of messages considered to be "recent") in the group chat session are analyzed using the topic modeling algorithm to determine the participants' current topic of discussion.

In embodiments, the topic divergence model generator 310 uses latent Dirichlet allocation (LDA) as the topic modeling algorithm. Alternatively, in other embodiments, a pachinko allocation model (PAM) is used as the topic modeling algorithm. LDA and PAM are natural language processing techniques that use machine learning to perform text-mining for discovering semantic structures in a body of text. In yet other embodiments, other text-mining algorithms are used.

In one example, using the chat data collected by the chat data collector 300, the topic divergence model generator 310 uses LDA to determine one or more main topics of discussion for the group chat (e.g., based on prior chat data for the group chat) as well as one or more current topics of discussion for the participants in the group chat session (e.g., based on recent messages in the group chat).

In embodiments, the topic divergence model generator 310 uses LDA to determine a list of the top x keywords (e.g., top 10 keywords) that represent the main topic of discussion in the group chat session as well as a list of the top x keywords that represent the participants' current topic of discussion in the group chat session. For example, in embodiments, LDA is used to determine a log-likelihood score for each of the words in a chat log, which is a score between 0 and 1 representing how "interesting" a word is with respect to other words. (Words mentioned relatively more frequently are be considered more interesting; words mentioned relatively less frequently or that are "stock" words such as prepositions are considered less interesting.) In embodiments, the x words with the highest log-likelihood scores are selected for the list of the top x keywords that represent the topic of discussion.

The topic divergence model generator 310 then compares the one or more current topics of discussion with the one or more main topics of discussion to determine whether or not there is divergence in the topics of discussion. In particular, the topic divergence model generator 310 determines a score indicating divergence between the one or more current topics of discussion and the one or more main topics of discussion based on a lexical distance between each of the keywords in the list of the top x keywords that represent the participants' current topic of discussion in the group chat session and each of the keywords in the list of the top x keywords that represent the main topic of discussion in the group chat session.

In embodiments, the topic divergence model generator 310 determines the lexical distance between keywords by using a model that produces word embeddings, such as word2vec or Global Vectors for Word Representation (GloVe), to determine the Cartesian coordinates of each of the keywords. The topic divergence model generator 310 then determines the lexical distance as the distance between the Cartesian coordinates of a first keyword and the Cartesian coordinates of a second keyword. Pairs of words that occupy points on a graph that are relatively closer to each other are considered to be relatively more similar, and pairs of words that occupy points on the graph that are relatively farther from each other are considered to be relatively less similar.

For example, in embodiments, the topic divergence model generator 310 determines a higher divergence score when the list of the top x keywords that represent the participants' current topic of discussion in the group chat session is lexically farther from the list of the top x keywords that represent the main topic of discussion in the group chat session and determines a lower divergence score when the list of the top x keywords that represent the participants' current topic of discussion in the group chat session is lexically closer to the list of the top x keywords that represent the main topic of discussion in the group chat session. That is, when the distances in Euclidean space between the keywords that represent the participants' current topic of discussion in the group chat session and the keywords that represent the main topic of discussion in the group chat session are relatively larger, the topic divergence model generator 310 determines a relatively higher divergence score, and when the distances are relatively smaller, the topic divergence model generator 310 determines a relatively smaller divergence score.

The topic divergence model generator 310 periodically redetermines the participants' current topic of discussion, as described above, updating the list of the top x keywords that represent the participants' current topic of discussion in the group chat session. For example, in embodiments, the topic divergence model generator 310 redetermines the participants' current topic of discussion every x minutes (e.g., every 10 minutes) or every time y additional messages (e.g., 10 messages) have been posted in the group chat. After redetermining the participants' current topic of discussion, the topic divergence model generator 310 redetermines the divergence score, as discussed above, using the updated list of the top x keywords that represent the participants' current topic of discussion in the group chat session.

Still referring to FIG. 3, in embodiments, the sidebar chat space generator 320 compares the divergence score determined by the topic divergence model generator 310 with a predetermined threshold. If the divergence score exceeds the predetermined threshold, then the sidebar chat space generator 320 creates a second chat space such as a sidebar chat space (or channel), hosted by the group chat server 210, for the participants' current topic of discussion. The sidebar chat space generator 320 causes the sidebar chat space to be displayed in the group chat graphical user interface on each of the plurality of user computing devices 230-1, 230-2, . . . , 230-n. In embodiments, the sidebar chat space generator 320 assigns a channel name to the sidebar chat space that indicates the current topic of discussion (i.e., the topic for which the sidebar space was generated).

In embodiments, the sidebar chat space generator 320 determines a plurality of group chat messages to move from the original group chat channel to the sidebar chat space based upon a similarity between the current topic of discussion that led to the creation of the sidebar chat space and a topic of each of the messages, determined as discussed above. In aspects, the sidebar chat space generator 320 causes a message to be displayed in the group chat graphical user interface on each of the plurality of user computing devices 230-1, 230-2, . . . , 230-n indicating that discussion of a particular topic has been moved to the sidebar chat space. In embodiments, the sidebar chat space generator 320 invites one or more subject matter experts to join the sidebar chat space based upon the current topic of discussion that led to the creation of the sidebar chat space.

In embodiments, each time the topic divergence model generator 310 redetermines the divergence score, the sidebar chat space generator 320 repeats the process of comparing the divergence score determined by the topic divergence model generator 310 with the predetermined threshold and creating a sidebar chat space if the divergence score exceeds the predetermined threshold.

In embodiments, the sidebar chat space generator 320 avoids generating a sidebar chat space in certain instances, even if the divergence score determined by the topic divergence model generator 310 exceeds the predetermined threshold. In one example, the sidebar chat space generator 320 does not create a sidebar chat space if a predetermined maximum number of sidebar chat spaces have already been created (e.g., three sidebar chat spaces).

Alternatively, if a particular group chat covers a large number of divergent topics (e.g., topic divergence model generator 310 repeatedly determines high divergence scores), the sidebar chat space generator 320 avoids creating a sidebar chat space unless the current topic of discussion determined by the topic divergence model generator 310 is included in a predetermined group of topics for which the sidebar chat space generator 320 is to generate a sidebar chat space.

In another embodiment, the sidebar chat space generator 320 uses two predetermined thresholds for the divergence score. In this example, the first threshold is a lower threshold that the sidebar chat space generator 320 monitors to determine if it is exceeded for a predetermined period of time and/or a predetermined number of group chat messages (e.g., the topic divergence model generator 310 redetermines the divergence score at one or more intervals over the predetermined period of time and/or the predetermined number of messages and the score exceeds the first threshold each time). In response to the first threshold being exceeded for the predetermined period of time and/or the predetermined number of group chat messages, the sidebar chat space generator 320 generates a sidebar chat space. In this example, the second threshold is a higher threshold that is monitored by the sidebar chat space generator 320. If the second threshold is exceeded, then the sidebar chat space generator 320 immediately generates a sidebar chat space.

In yet another embodiment, the topic divergence model generator 310 and the sidebar chat space generator 320 monitor each of the sidebar chat spaces created by the sidebar chat space generator 320 to determine if the sidebar chat space needs a separate breakout space (e.g., another sidebar chat space). In this example, the topic divergence model generator 310 determines a score indicating a divergence between the one or more current topics of discussion in the sidebar chat space and the one or more main topics of discussion for the sidebar chat space, and the sidebar chat space generator 320 generates another sidebar chat space if the divergence score exceeds a predetermined threshold, as discussed above.

Still referring to FIG. 3, in embodiments, the topic divergence model refiner 330 analyzes chat data from each of the sidebar chat spaces created by the sidebar chat space generator 320. In particular, the topic divergence model refiner 330 determines a number of messages posted in the sidebar chat space and/or a number of participants in the sidebar chat space and determines an efficacy of the sidebar chat space based on the number of messages and/or the number of participants. In other embodiments, the topic divergence model refiner 330 also uses natural language processing techniques such as emotive analysis to determine the efficacy of the sidebar chat space. In yet other embodiments, the topic divergence model refiner causes the topic divergence model generator 310 to determine a divergence score for the sidebar chat space and determines the efficacy of the sidebar chat space based on the divergence score (e.g., a relatively lower divergence score indicates that the sidebar chat stayed relatively more on topic and thus the sidebar chat space was relatively more efficacious).

The topic divergence model refiner 330 then uses the determined efficacy of the sidebar chat space to refine the topic divergence model generated by the topic divergence model generator 310. In particular, the topic divergence model refiner 330 adjusts the predetermined divergence score threshold (or thresholds) used by the sidebar chat space generator 320 to determine when to generate a sidebar chat space as discussed above. For example, in embodiments, if the efficacy of a particular sidebar chat space does not exceed a predetermined minimum efficacy threshold, then the topic divergence model refiner 330 raises the divergence score threshold (or thresholds) used by the sidebar chat space generator 320.

In embodiments, if the topic divergence model refiner 330 determines that the efficacy of a particular sidebar chat space does not exceed a predetermined minimum efficacy threshold, the topic divergence model refiner 330 moves (e.g., merges) the messages posted in the sidebar chat space back into the original group chat channel and cause the sidebar chat space to no longer be displayed in the group chat graphical user interface on each of the plurality of user computing devices 230-1, 230-2, . . . , 230-*n*.

Figure 4:
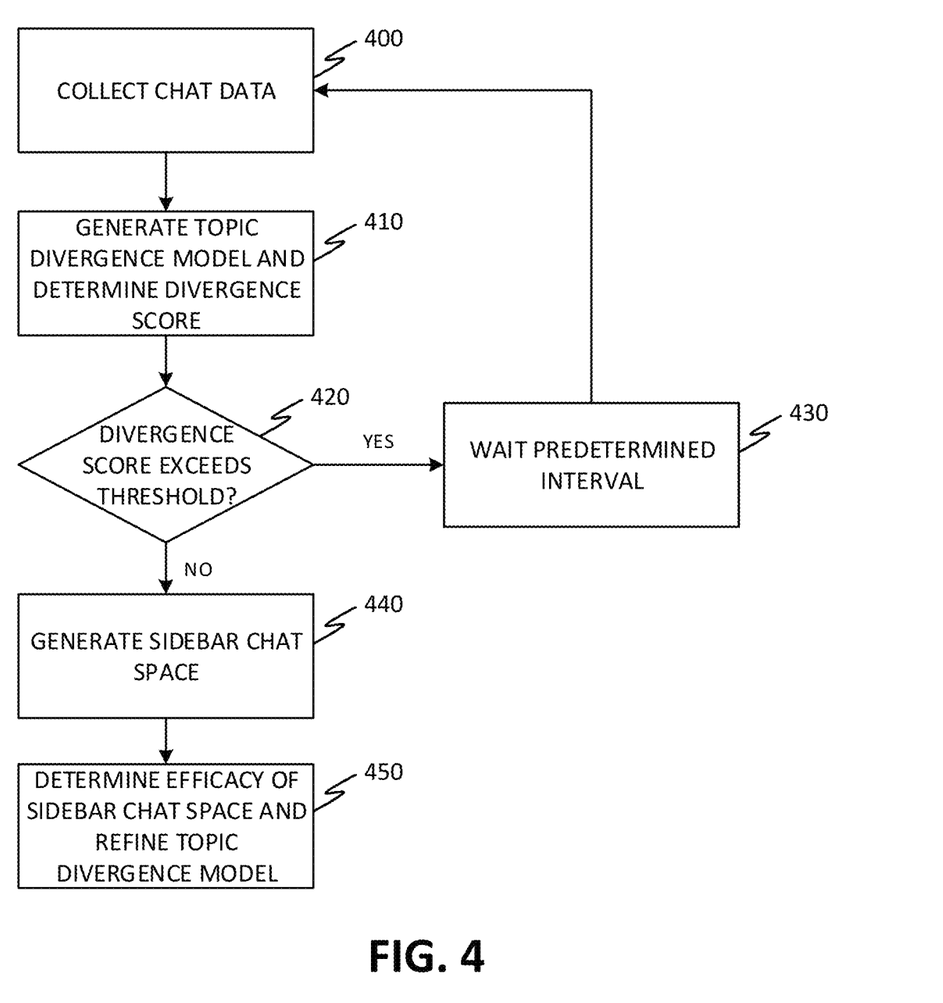
FIG. 4 depicts a flowchart of an exemplary method in accordance with aspects of the invention.

FIG. 4 depicts a flowchart of an exemplary method in accordance with aspects of the invention. The steps of the method are performed in the environment of FIG. 2 and are described with reference to the elements and steps described with respect to FIGS. 1, 2, and 3.

At step 400, the system collects chat data. In embodiments, as described with respect to FIG. 3, step 400 comprises the chat data collector 300 collecting data from a current (i.e., ongoing) group chat session in the group chat server 210.

At step 410, the system generates a topic divergence model and determines a divergence score. In embodiments, as described with respect to FIG. 3, step 410 comprises the topic divergence model generator 310 determining a main topic of discussion, determining a current topic of discussion, and determining a score indicating a divergence between the current topic of discussion and the main topic of discussion.

At step 420, the system determines whether or not the divergence score exceeds a threshold. In embodiments, as described with respect to FIG. 3, step 420 comprises the sidebar chat space generator 320 comparing the divergence score determined by the topic divergence model generator 310 with a predetermined threshold. If the divergence score does not exceed the predetermined threshold, then flow proceeds to step 430. If the divergence score does exceed the predetermined threshold, then flow proceeds to step 440.

At step 430, the system waits for a predetermined interval before repeating the steps 400 through 420. In embodiments, as described with respect to FIG. 3, step 430 comprises the topic divergence model generator 310 waiting a predetermined number of minutes or a predetermined number of messages before redetermining the participants' current topic of discussion.

At step 440, the system generates a sidebar chat space. In embodiments, as described with respect to FIG. 3, step 440 comprises the sidebar chat space generator 320 creating a sidebar chat space (or channel), hosted by the group chat server 210, for the participants' current topic of discussion. The sidebar chat space generator 320 causes the sidebar chat space to be displayed in the group chat graphical user interface on each of the plurality of user computing devices 230-1, 230-2, . . . , 230-*n*.

At step 450, the system determines the efficacy of the sidebar chat space and refines the topic divergence model. In embodiments, as described with respect to FIG. 3, step 450 comprises the topic divergence model refiner 330 analyzing chat data from each of the sidebar chat spaces created by the sidebar chat space generator 320 to determine the efficacy of the sidebar chat space and adjusting the predetermined divergence score threshold based on the determined efficacy.

Figure 5:
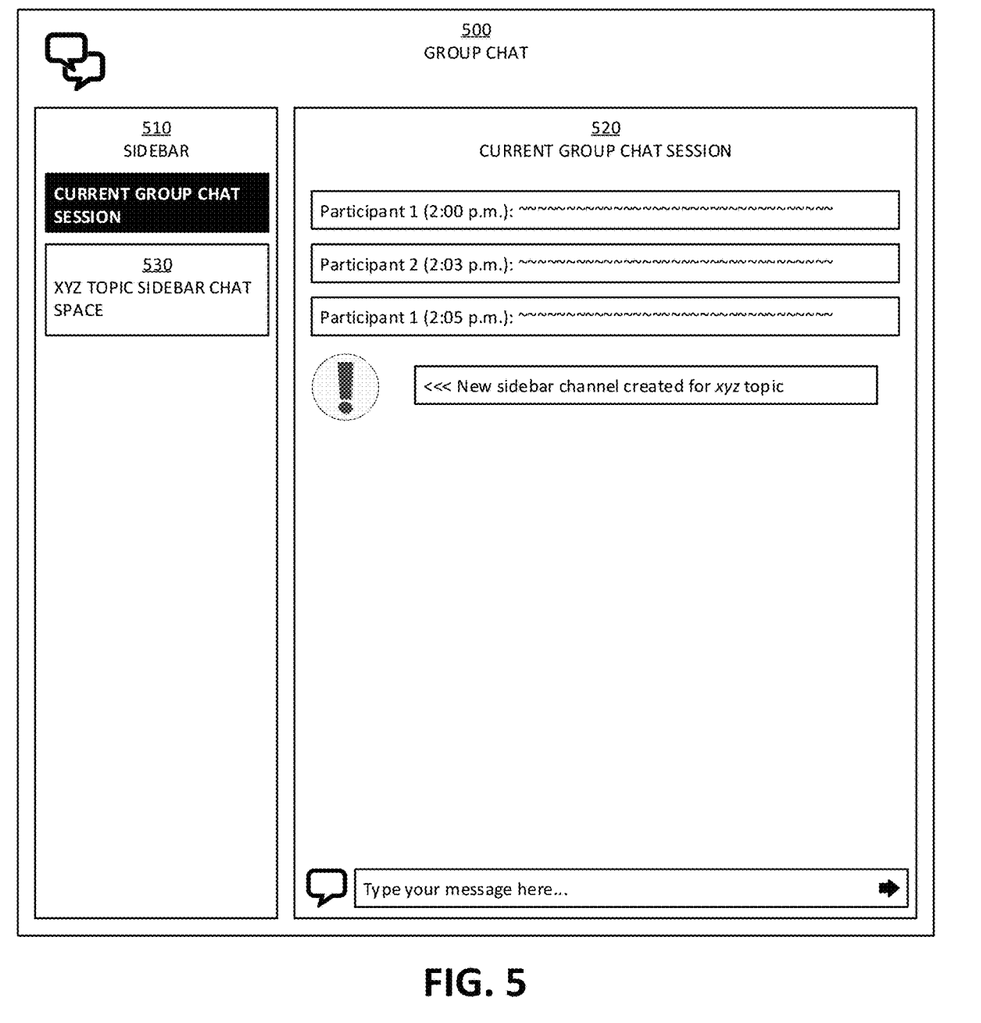
FIG. 5 depicts an illustrative example of a group chat graphical user interface displayed on a display of a user computing device in accordance with aspects of the invention.

FIG. 5 depicts an illustrative example of a group chat graphical user interface 500 displayed on a display of a user computing device 230-1, 230-2, . . . , 230-n (of FIG. 2) in accordance with aspects of the invention. The current (i.e., ongoing) group chat session 520 is displayed in a central portion of the group chat graphical user interface 500. A plurality of other group chats is displayed in a sidebar 510 of the graphical user interface. A new sidebar chat space 530 created by the sidebar chat space generator 320 is displayed in the sidebar 510 of the group chat graphical user interface 500.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    collecting, by a computing device, data from a first group chat;
    determining, by the computing device, a main topic of the first group chat and a current topic of the first group chat using the data collected from the first group chat;
    determining, by the computing device, a first divergence score representing a degree of divergence between the main topic of the first group chat and the current topic of the first group chat;
    determining, by the computing device, that the first divergence score exceeds a predetermined divergence score threshold;
    in response to determining that the first divergence score exceeds the predetermined divergence score threshold, the computing device creating a second group chat to discuss the current topic of the first chat group;
    determining, by the computing device, an efficacy for the second group chat, the efficacy increasing as the first divergence score decreases; and
    raising, by the computing device, the predetermined divergence score threshold as a result of the efficacy for the second group chat not exceeding a minimum efficacy threshold,
    wherein the computing device determines the efficacy by using an emotive analysis.

2. The method according to claim 1, further comprising determining the first divergence score based on a lexical distance between the main topic of the first group chat and the current topic of the first group chat.

3. The method according to claim 2, further comprising determining the lexical distance between the main topic of the first group chat and the current topic of the first group chat by generating word embeddings for the main topic and the current topic and then determining a Euclidean distance between the word embeddings for the main topic and the current topic.

4. The method according to claim 1, wherein the data collected from the first group chat comprises time stamped chat logs, a name of the group chat, and names of participants in the group chat.

5. The method according to claim 1, wherein determining the main topic of the first group chat and the current topic of the first group chat comprises using latent Dirichlet allocation to perform topic modeling.

6. The method according to claim 1, wherein creating the second group chat comprises moving a plurality of group chat messages from the first group chat to the second group chat.

7. The method according to claim 1, further comprising:
    determining, by the computing device, a main topic of the second group chat and a current topic of the second group chat;
    determining, by the computing device, a second divergence score representing a degree of divergence between the main topic of the second group chat and the current topic of the second group chat; and
    adjusting the predetermined divergence score threshold based on the second divergence score.

8. The method according to claim 1, wherein the efficacy is based on a number of participants in the second group chat.

9. The method according to claim 1, wherein the efficacy is based on a number of messages in the second group chat.

10. The method according to claim 1, further comprising inviting, by the computing device, a subject matter expert to join the second group chat based on the current topic of the first group chat.

11. A computer program product comprising a computer readable storage medium having program instructions embodied therewith, the program instructions executable by a computing device to cause the computing device to:
    collect data from a first group chat;
    determine a main topic of the first group chat and a current topic of the first group chat using the data collected from the first group chat;
    determine a first divergence score representing a degree of divergence between the main topic of the first group chat and the current topic of the first group chat;
    determine that the first divergence score exceeds a predetermined divergence score threshold;

in response to determining that the first divergence score exceeds the predetermined divergence score threshold, creating a second group chat and moving a plurality of group chat messages from the first group chat to the second group chat;

determine an efficacy for the second group chat, the efficacy increasing as the first divergence score decreases, the efficacy being determined using an emotive analysis;

moving the plurality of group chat messages from the second group chat to the first group chat as a result of the efficacy for the second group chat not exceeding a minimum efficacy threshold; and raising the predetermined divergence score threshold as a result of the efficacy for the second group chat not exceeding a minimum efficacy threshold.

12. The computer program product according to claim 11, wherein the divergence score is determined based on a lexical distance between the main topic of the first group chat and the current topic of the first group chat.

13. The computer program product according to claim 12, wherein the lexical distance between the main topic of the first group chat and the current topic of the first group chat is determined by generating word embeddings for the main topic and the current topic and then determining a Euclidean distance between the word embeddings for the main topic and the current topic.

14. The computer program product according to claim 11, wherein the data collected from the first group chat comprises time stamped chat logs, a name of the group chat, and names of participants in the group chat.

15. The computer program product according to claim 11, wherein determining the main topic of the first group chat and the current topic of the first group chat comprises using latent Dirichlet allocation to perform topic modeling.

16. The computer program product according to claim 11, wherein determining the efficacy for the second group chat comprises:
- determining a main topic of the second group chat and a current topic of the second group chat; and
- determining a second divergence score representing a degree of divergence between the main topic of the second group chat and the current topic of the second group chat.

17. A system comprising:
- a hardware processor, a computer readable memory, and a computer readable storage medium associated with a computing device;
- program instructions configured to collect data from a first group chat;
- program instructions configured to determine a main topic of the first group chat and a current topic of the first group chat using the data collected from the first group chat;
- program instructions configured to determine a first divergence score representing a degree of divergence between the main topic of the first group chat and the current topic of the first group chat;
- program instructions configured to determine that the first divergence score exceeds a first predetermined divergence score threshold;
- program instructions configured to create a second group chat in response to determining that the first divergence score exceeds the first predetermined divergence score threshold;
- program instructions configured to determine an efficacy for the second group chat, the efficacy being determined using an emotive analysis; and
- program instructions to raise the predetermined divergence score threshold as a result of the efficacy for the second group chat not exceeding a predetermined minimum efficacy threshold,
- wherein the efficacy is based on a number of participants in the second group chat, and
- the program instructions are stored on the computer readable storage medium for execution by the hardware processor via the computer readable memory.

18. The system according to claim 17, further comprising:
- program instructions configured to determine a main topic of the second group chat and a current topic of the second group chat; and
- program instructions configured to determine a second divergence score representing a degree of divergence between the main topic of the second group chat and the current topic of the second group chat.

19. The system according to claim 18, further comprising program instructions configured to display, on a group chat graphical user interface on a plurality of user devices, a second group chat space corresponding to the second group chat;
- program instructions configured to merge the second group chat back into the first group chat in response to the efficacy not exceeding the predetermined minimum efficacy threshold; and
- program instructions configured to cause the second group chat space to no longer be displayed on the group chat graphical user interface as a result of the merging of the second group chat back into the first group chat.

* * * * *